United States Patent [19] [11] 4,153,939
Kudou [45] May 8, 1979

[54] INCREMENTER CIRCUIT
[75] Inventor: Eiichi Kudou, Tokyo, Japan
[73] Assignee: Nippon Electric Co., Ltd., Tokyo, Japan
[21] Appl. No.: 876,311
[22] Filed: Feb. 9, 1978

Related U.S. Application Data

[63] Continuation of Ser. No. 762,004, Jan. 24, 1977, abandoned.

[30] Foreign Application Priority Data

Jan. 24, 1976 [JP] Japan .................................. 51-6363

[51] Int. Cl.² .............................................. G06F 7/50
[52] U.S. Cl. .................................................. 364/770
[58] Field of Search ............ 364/770; 307/216, 220 C; 328/159

[56] References Cited
U.S. PATENT DOCUMENTS 3,668,425  6/1972  Schmidt, Jr. .......................... 307/216
3,989,940  11/1976  Kihara .................................. 364/770
4,006,365  2/1977  Marzin et al. ..................... 307/216 X
4,052,604  10/1977  Maitland et al. ................ 364/770 X

OTHER PUBLICATIONS

J. E. Elliott, "Increment-Decrement Logic", *IBM Technical Disclosure Bulletin*, vol. 11, No. 3 Aug. 1968, pp. 297-298.
R. K. Richards, *Arithmetic Operations in Digital Computers*, D. Van Nostrand Co.Inc., 1955, pp. 196-198.

*Primary Examiner*—Jerry Smith
*Attorney, Agent, or Firm*—Hopgood, Calimafde, Kalil, Blaustein & Lieberman

[57] ABSTRACT

An incrementer circuit receives m digit binary input signals and derives m digit binary output signals. First to (m-1)th carry signals are generated, and the h-th (where h is integer between 2 and m-1) carry signal generator includes a transfer gate which transfers one of th (h-1)th carry signal and a reference signal in response to the h-th digit input signal as the h-th carry signal. The incrementer circuit is characterized by low power consumption and low propagation delay.

4 Claims, 4 Drawing Figures

INCREMENTER CIRCUIT

This is a continuation of Ser. No. 762,004 filed Jan. 24, 1977, now abandoned.

The present invention relates to an incrementer circuit, and more specifically an incrementer circuit useful for a program counter circuit used in a central processor of a data processing system, notably in a microprocessor of a microcomputer system, of the type consisting essentially of insulated-gate field effect transistors.

In a data processor, program instructions to be executed are stored in the memory; generally, a series of instructions are located in order at adjacent addresses of the memory. Therefore, the instruction succeeding the one being executed should be read out of a memory of an address which is obtained by adding a binary signal "1" to the address of the memory where the instruction being executed is stored. The program counter generates an address signal for reading out the next instruction by adding "1" to the address of the memory where the instruction being executed is stored. The program counter comprises an incrementer circuit and a register circuit. The incrementer circuit successively increases by one the address of the memory storing the instruction to be executed, and the register circuit holds an address output from the incrementer circuit. The register output is fed back to the input of the incrementer circuit, in which "1" is added to its input signal. A typical incrementer circuit consists essentially of exclusive OR circuits and AND gate circuits as will be described in more detail. Generally, the address of the memory storing a program instruction to be processed is expressed by a multidigit binary code ("0" and "1"), and an exclusive OR circuit and an AND gate circuit are provided for each digit. An output $Q'$ ($=Q+$"1") is obtained by adding "1" to the input data Q of the incrementer circuit in the following manner. The signal "1" is added to the least significant digit of the data Q and when a carry occurs, the carry information "1" is propagated to the next digit. Then the carry information "1" is added to the next-more-significant digit of the data Q. When a carry occurs in this digit, the carry information "1" is propagated to the next digit. Thus the carry information is successively propagated to more-significant-digit positions. As will be described in detail, one digit of the output data depends upon the same digit of the input data and the output of the AND gate circuit which is decided by the data of all digits preceded by the same digit of the input data Q and the added "1". This means that the number of inputs of the AND gate circuit increases as the digit position advances, resulting in the need for a greater number of circuit elements. Because the AND gate circuit comprises direct-current paths, the power consumed by the incrementer circuit increases with an increase in the number of data digits. These characteristics of conventional incrementer circuits are not advantageous for use in a high performance data processor, particularly to a processor made of a large-scale integrated (LSI) circuit.

An object of the present invention is to provide an incrementer circuit that is simple in construction and which has a reduced number of circuit elements.

Another object of the invention is to provide an incrementer circuit that can be operated with a minimum of power.

The incrementer circuit of the invention is capable of receiving an input information of m digits (where m is an integer not less than 2) and adding "1" to the input information. The incrementer circuit comprises first to m-th input terminals for receiving first to m-th digit binary input signals, respectively, first to m-th output terminals for deriving first to m-th digit binary output signals, respectively, and first to (m−1)th means for generating first to (m−1)th carry signals, respectively. The h-th (where h denotes each of the integers from 1 to m−1) of the generating means generates the h-th carry signal only when the input signals of the digits having the precedence of the h-th digit are all "1" binary signals. The incrementer circuit further comprises a first transfer gate circuit for transferring the inverted signal of the first digit input signal to the first output terminal, and a second to m-th transfer gate circuit for transferring the second to m-th digit input signals or the inverted signals of the second to m-th digit input signals to the second m-th output terminals, respectively. The i-th (where i denotes each of the integers from 2 to m) transfer gate circuit is controlled by the (i−1)th carry signal and transfers the inverted signal of the i-th digit input signal to the i-th output terminal in response to the presence of the (i−1)th carry signal and the i-th digit input signal to the i-th output terminal in response to the absence of the (i−1)th carry signal.

Favorably, the incrementer circuit of the invention is provided with means for transferring its output to its input terminals, thereby enabling the operation of addition of "1" to its output to be automatically continued.

Further objects, features and advantages of the invention will become more apparent from the following description when read in conjunction with the accompanying drawings, in which.

Figure 1:
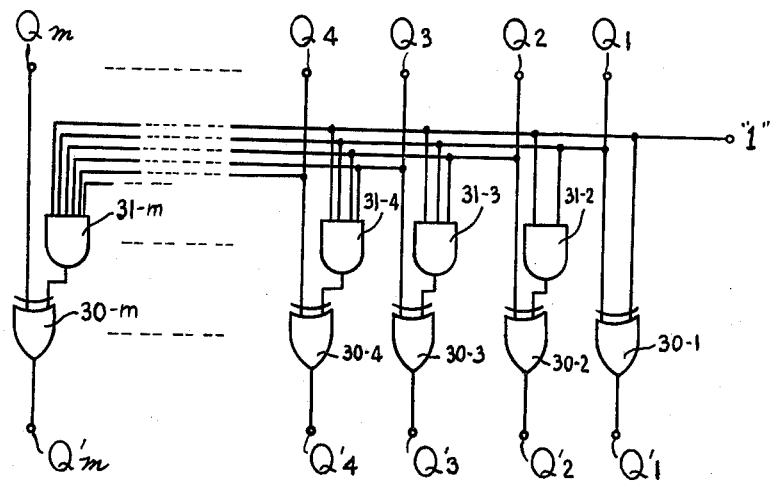
FIG. 1 is a block diagram of a prior art incrementer circuit.

With reference to FIG. 1, a prior art incrementer circuit is shown, in which an output information having m digits $Q'1$ to $Q'm$ is formed by adding a binary signal "1" to an input information having m digits Q1 to Qm. For the least significant digit, the input signal Q1 of this digit and the addend "1" are applied to an exclusive OR circuit 30-1. When the input signal Q1 of the least significant digit is "1", the output $Q'1$ of the exclusive OR circuit 30-1 is "0". When the input Q1 is "0", the output $Q'1$ is "1".

For the second digit, the input signal Q2 of this digit is applied to one input of an exclusive OR circuit 30-2, and the output of an AND circuit 31-2 is applied to the other input thereof. The AND circuit 31-2 is supplied at its input with the input Q1 and the addend "1". Therefore, when the output of the AND circuit 31-2 is "1", the output $Q'2$ of the exclusive OR circuit 30-2 is the signal $\overline{Q2}$ which is the inverted input signal Q2. When the output of the AND circuit 31-2 is "0", the output $Q'2$ of the exclusive OR circuit 30-2 is equal to the input signal Q2. With respect to the third digit, the input signal Q3 of this digit is applied to one input of an exclusive OR circuit 30-3, and the inputs Q1, Q2 and the addend "1" are applied to an AND circuit 31-3. The output of the AND circuit 31-3 is applied to the other input of the exclusive OR circuit 30-3. Therefore, when the inputs Q1 and Q2 are all "1", the AND circuit 31-3 generates "1" at its output, and hence the output $Q'3$ of the exclusive OR circuit 30-3 is the inverted signal of the input Q3. When at least one of the inputs Q1 and Q2 is "0", the output of the AND circuit 31-3 is "0", and hence the output $Q'3$ of the exclusive OR circuit 30-3 is identical to the input signal Q3.

Here the circuits of digits Q4 to Qm are formed of exclusive OR circuits 30-4 to 30-m and AND circuits 31-4 to 31-m. Accordingly, for the digit Qm, there must be m numbers of inputs at the AND circuit 31-m. It is now obvious that in the prior art incrementer circuit the number of elements composing the AND gate increases with an increase in the number of digits and the amount of power consumed increases accordingly.

Figure 2:
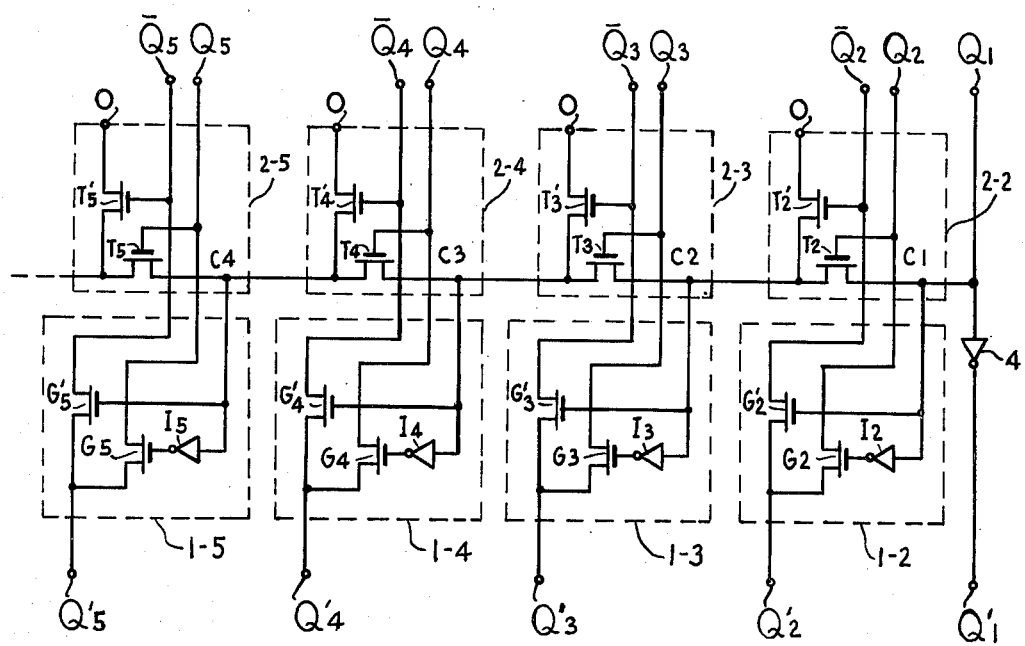
FIG. 2 is a circuit diagram of an incrementer circuit according to an embodiment of the invention.

Referring to FIG. 2, a circuit diagram is shown for illustrating an incrementer circuit according to an embodiment of the invention using n-channel insulated-gate field-effect transistors (IGFET's) which are turned on by a "1" binary signal applied to the gate and turned off by a "0" binary signal applied to the gate. For the least significant digit, the inverted signal $\overline{Q1}$ of its input signal Q1 is transferred to the output terminal as the output $Q'1$ of the least significant digit by an inverter circuit 4. For the second digit Q2 to the most significant digit Qm, a transfer gate circuit 1.i (where i denotes each of the integers from 2 to m) is used. Each of the gate circuits comprises transfer gate transistors Gi and G'i which transfer the input signals Qi of the individual digits and their inverted signals $\overline{Qi}$ applied to their inputs into their outputs, respectively, and an inverter Ii which inverts the carry signal $C(i-1)$. The gate transistors Gi and G'i are controlled by the inverted signal of the carry signal $C(i-1)$ and the carry signal $C(i-1)$, respectively.

The least significant digit input signal Q1 is used as the first carry signal C1. Second to m-th carry signals are generated by carry signal generating circuits 2.2 to 2.m, respectively. Each of the carry signal generating circuits comprises transfer gate transistors Ti and T'i. The gate transistor Ti is controlled by the i-th digit input signal Qi and is supplied at its input with the preceding carry signal $C(i-1)$. The gate transistor T'i is controlled by the inverted signal of the i-th digit input signal Qi and is supplied at its input with the reference voltage 0 corresponding to the "0" binary signal. The outputs of transistors Ti and T'i are connected in common at the carry signal output terminal.

The circuit of FIG. 2 operates in the following manner (assume m=4)

(1) When the input signal (Q4, Q3, Q2, Q1) is (0, 0, 0, 0), "1" is generated as the output signal $Q'1$ for the least significant digit by the inverter circuit 4. For the second digit, the transistor G2 turns on because the carry signal C1 from the least significant digit is "0", and thus "0" of the input signal Q2 of the second digit is generated as the output signal $Q'2$ of this digit. In this state, the transistor T2 of the carry signal generating circuit 2.2 is nonconducting and the transistor T'2 is conducting, causing the signal 0("0") to be transmitted as the signal C2 of the next digit through the transistor T'2. As a result, the transistor G3 of the third digit transfer gate circuit 1.3 turns on, thereby causing "0" of the input signal Q3 to be generated as the output signal $Q'3$ of the digit. Because the transistor T3 of the carry signal generating circuit 2.3 is nonconducting and the transistor T'3 is conducting, the signal 0("0") is transmitted as the signal C3 of the next digit as in the case of the second digit. Accordingly, the transistor G4 of the fourth digit transfer gate circuit 1.4 turns on, causing "0" of the input signal Q4 of the fourth digit to be generated as the output signal $Q'4$ of this digit. As a consequence, the incrementer output ($Q'4, Q'3, Q'2, Q'1$) assumes (0, 0, 0, 1) which is an advance of "1" from the signal (0, 0, 0, 0). This output is applied to the input terminals as a new input signal (Q4, Q3, Q2, Q1).

(2) Thus, suppose the input signal is (0, 0, 0, 1). Then "0" is generated as the output $Q'1$ in the least significant digit. For the second digit, the carry signal C1 from the least significant digit assumes "1". Therefore the transistor G'2 turns on, causing "1" of the inverted signal $\overline{Q2}$ of the input signal of the second digit to be generated at the output of the second digit $Q'2$. Because the input signals Q3 and Q4 are "0", the transistors T2 and T3 are nonconducting and the transistors T'2 and T'3 are conducting, causing both the output signals $Q'3$ and $Q'4$ of the third and fourth digits to be "0" as in (1) above. Thus the output signal assumes (0, 0, 1, 0) which is an advance of "1" from the input signal (0, 0, 0, 1).

(3) When this output signal is applied to the input terminals Q1, Q2, Q3 and Q4 and the input signal becomes (0, 0, 1, 0), the output signal $Q'1$ is "1" in the least significant digit. For the second digit, because the carry signal C1 is "0", the transistor G2 turns on, causing "1" of the input signal Q2 of the second digit to be generated as the output signal $Q'2$. The transistor T2 of the carry signal generating circuit 2.2 turns on, causing "0" of the carry signal C1 to be propagated to the signal C2 of the next digit. Because the input signals Q3 and Q4 are "0", The transistor T3 is nonconducting and the transistor T'3 is conducting, with the result that the output signals $Q'3$ and $Q'4$ are "0". Thus the output (0, 0, 1, 1) which is an advance from "1" from the input (0, 0, 1, 0) is obtained.

(4) When the input signal is (0, 0, 1, 1), the output signal $Q'1$ in the least significant digit is "0". For the second digit, because the carry signal C1 is "1", the transistor G'2 turns on, causing "0" of the inverted signal $\overline{Q2}$ of the input signal Q2 to be generated as the output signal $Q'2$. Because the input signal Q2 is "1", the transistor T2 turns on and the carry signal C1 ("1") is propagated as the carry signal C2 to the third digit. Accordingly, the transistor G'3 turns on, causing "1" of the inverted signal $\overline{Q3}$ to be generated as the output signal $Q'3$. Because the transistor T2 is nonconducting and the transistor T'3 is conducting, the third digit carry signal C3 assumes "0" and the transistor G4 turns on, causing "0" of the input signal Q4 to be generated as the output signal $Q'4$. Thus the advanced output (0, 1, 0, 0) is derived from the input signal (0, 0, 1, 1).

As described above, the logic "1" signal is propagated as the carry signal to the next-more-significant-digit position when a carry is needed. When a carry is not needed, the logic "0" signal is propagated thereto.

Figure 3:
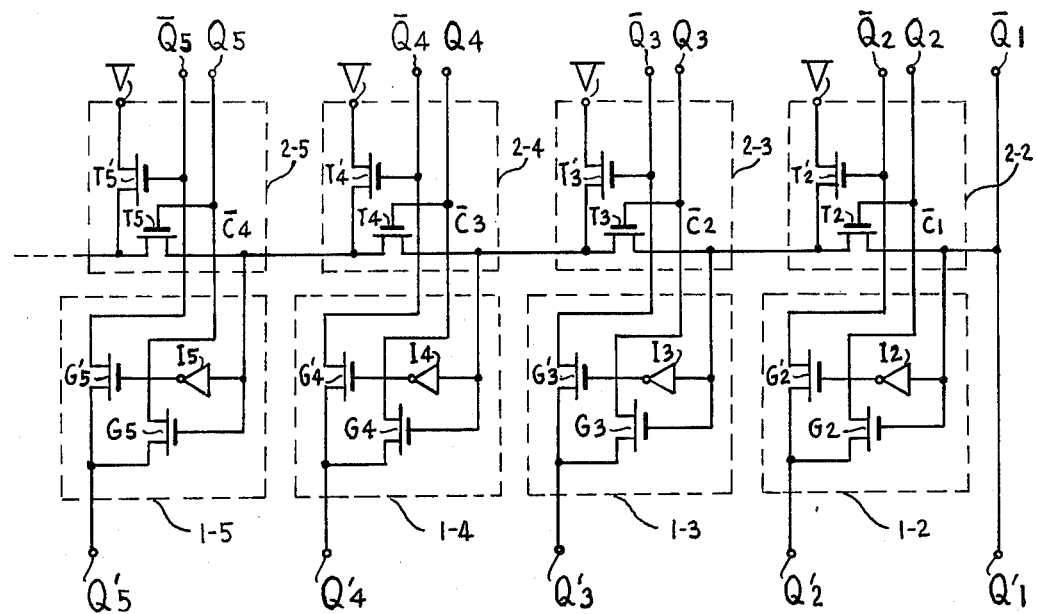
FIG. 3 is a circuit diagram of an incrementer circuit according to another embodiment of the invention.

FIG. 3 is a circuit diagram of an incrementer circuit according to another embodiment of the invention in which the logic "0" signal is propagated as the carry signal to the next-more-significant-digit position when a carry is needed. When a carry is not needed, the logic "1" signal is propagated thereto. More specifically, for the least significant digit Q1, the inverted signal $\overline{Q1}$ of the input signal is taken as its output signal $\overline{Q1}$. Assuming that the inverted signal $\overline{Q1}$ is provided by an external circuit or by an inverter (not shown) in the incrementer circuit, this inverted signal is supplied as a signal $\overline{C1}$ representing a carry to the second digit transfer gate circuit 1.2 and to the carry signal generating circuit 2.2.

In each transfer gate circuit 1.i, a signal $\overline{C}(i-1)$ representing a carry directly controls the transfer gate transistor Gi, and a signal C(i−1) inverted from the signal $\overline{C}(i-1)$ by the inverter Ii controls the transistor G'i. In the carry signal generating circuit 2.i, the transistor T'i in the on state transmits to the next digit circuit a signal V which corresponds to the logic "1" level generated from a reference voltage source. Other circuit arrangements are the same as those shown in FIG. 2.

In the circuit of FIG. 3, when a carry is needed at the (i−1)th digit, the signal $\overline{C}(i-1)$ representing a carry is "0" and hence the transmission gate transistor G'i of the $i^{th}$ digit turns on, causing the inverted signal Qi of the input signal $\overline{Qi}$ to be generated as the output Q'i. As for the signal $\overline{Ci}$ representing a carry transmitted to the next digit (i+1), the signal $\overline{C}(i-1)$ which represents a carry from the preceding digit is propagated when the input signal Qi is "1". When the input signal Qi is "0", the signal V (corresponding to the binary "1" level) is propagated from the input of the gate transistor T'i. In this manner the incrementer circuit shown in FIG. 3 generates an output as in the circuit shown in FIG. 2.

As described above, in the incrementer circuits shown in FIGS. 2 and 3, the number of circuit elements necessary for each digit is the same. Furthermore, only two transmission gate transistors suffice for the carry propagation circuit. Still further, no dc path is present in the carry propagation circuit and hence the power consumed by the circuit is minimized.

Figure 4:
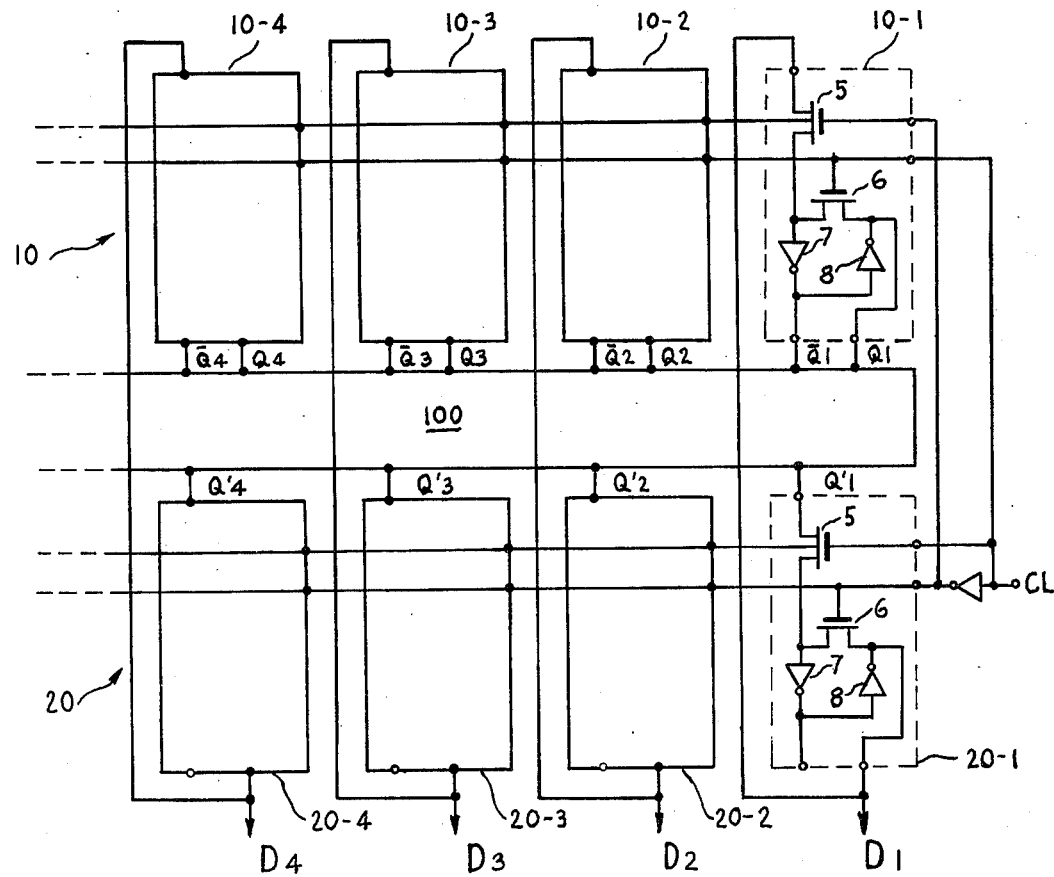
FIG. 4 is a block diagram showing a program counter formed of the incrementer circuit of the invention.

FIG. 4 is a block diagram illustrating a program counter which uses an incrementer circuit 100 of the invention, having registers 10 and 20 for storing the output of the incrementer circuit 100. The register 20 comprises flip-flops 20-1 to 20-m which store individual output digits of the incrementer circuit. The register 10 comprises flip-flops 10-1 to 10-m for storing individual output digits of the register 20. Outputs Qi and $\overline{Qi}$ of flip-flops 10-i in the second digit and the digits succeeding to the second digit are connected to the inputs Qi and $\overline{Qi}$ of the incrementer circuit shown in FIG. 2 or FIG. 3. For the least significant digit, the true output Q1 of the flip-flop 10-1 is connected to the input signal Q1 when the incrementer circuit of FIG. 2 is used, or the complementary output $\overline{Q1}$ of the flip-flop 10-1 is connected to the input signal $\overline{Q1}$ when the incrementer circuit of FIG. 3 is used.

Digit outputs Q'1 to Q'm of the incrementer circuit are supplied to the inputs of the flip-flops 20-1 to 20-m, respectively.

The configurations of the flip-flop circuits are the same in the registers 10 and 20. The flip-flop for storing the data of the first digit, for example, consists of transistors 5 and 6 and inverters 7 and 8. The transistor 5 is used to write an input into the flip-flop. The transistor 6 and the inverters 7 and 8 form a data holding loop. The input of the transistor 5 is applied to the input of the inverter 7. The write transistor 5 and the holding transistor 6 have their conduction states controlled by clock signals CL and $\overline{CL}$ given in opposite polarities, respectively. In the flip-flops 10-1 to 10-m, therefore, the input is held by the transistor 6 and the inverters 7 and 8 when the signal CL is "1", and the signal applied to the input of the transistor 5 is written in the flip-flop when the signal CL is "0". In the flip-flops 20-1 to 20-m, the input is held when the signal CL is "0", and the input is written therein when the signal CL is "1". Thus the digit data Q1 and $\overline{Q1}$ stored in the flip-flops 10-1 to 10-m are supplied to the incrementer circuit 100 when the signal CL is "1", causing "1" to be added to the data. The resultant output data Q'1 to Q'm are written in the flip-flops 20-1 to 20-m which are in the 'write' state. When the signal CL turns to "0", the flip-flops 20-1 to 20-m are in the 'data storing' state, causing the output data of the incrementer circuit 100 to be generated as output signals D1 to Dm which are supplied to an external circuit as address signals for the program instruction. Concurrently, data of the individual digits are written in the flip-flops 10-1 to 10-m which are in the 'write' state.

Repeating a series of the above operations, the incrementer circuit of the invention sequentially designates program instructions for a microcomputer or the like.

I claim:

1. An incrementer circuit comprising first to m-th (where m is an integer of 2 or more) input terminals for receiving first to m-th digit binary input signals respectively, first to m-th output terminals for deriving first to m-th digit binary output signals respectively, first means for generating a first carry signal, second to (m−1)th means for generating second to (m−1)th carry signal respectively, the h-th (where h denotes each of the integers from 2 to m−1) carry signal generating means including a first insulated-gate field effect transistor, the gate and one of the source and drain of said first field effect transistor being supplied with said h-th digit input signal and with the (h−1)th carry signal respectively, a second insulated-gate field effect transistor, the gate and one of the source and drain of said second field effect transistor being supplied with the inverted signal of said h-th digit input signal and with a reference voltage corresponding to a "0" binary signal respectively, a carry signal output terminal connected to the other of the source and drain of said first transistor and the other of the source and drain of said second transistor in common, a first transfer gate circuit for transferring the inverted signal of said first digit input signals to said first output terminal, and second to m-th gating means, the k-th (where k denotes each of the integers from 2 to m−1) gating means including a third insulated-gate field effect transistor for transferring the k-th digit input signal to said k-th output terminal in response to a "0" binary signal of the (k−1)th carry signal and a fourth insulated-gate field effect transistor for transferring the inverted signal of said k-th digit input signal to said k-th output terminal in response to a "1" binary signal of the (k−1)th carry signal.

2. The incrementor circuit according to claim 1, wherein said first means includes a wiring means connected between said first input terminal and the one of the source and drain of said first transistor in said second carry signal generating means.

3. An incrementer circuit comprising first to m-th (where m is an integer of 2 or more than 2) input terminals for receiving first to m-th digit binary input signals respectively, first to m-th output terminals, first means for generating a first carry signal, second to (m−1)th means for generating second to (m−1)th carry signal, respectively, the h-th (where h denotes each of the integers from 2 to m−1) carry signal generating means including a first insulated-gate field effect transistor, the gate and one of the source and drain of said first field effect transistor being supplied with said h-th digit input signal and with the (h−1)th carry signal respectively, a second insulated-gate field effect transistor, the gate and one of the source and drain of said second transistor being supplied with the inverted signal of said h-th digit input signal and with a reference voltage corresponding to a "1" binary signal respectively, and a carry signal output terminal connected to the other of the source and drain of said first transistor and the other of the source and drain of said second transistor in common, first transfer means for transferring said first digit input signal to said first output terminal, and second to m-th gating means, the k-th (where k denotes each of the integers from 2 to m−1) gating means including a third insulated-gate field effect transistor for transferring the k-th digit input signal to said k-th output terminal in response to a "1" binary signal of the (k−1)th carry signal, and a fourth insulated-gate field effect transistor for transferring the inverted signal of said k-th digit input signal in response to a "0" binary signal of the (k−1)the carry signal.

4. The incrementer circuit according to claim 3, wherein said first transfer means includes wiring means connected between said first input terminal and said first output terminal.

* * * * *